J. R. SANFORD & J. G. DOUGHTY.
TIRE TREAD.
APPLICATION FILED JAN. 6, 1909.

929,632.

Patented July 27, 1909.

Witnesses:
Chas. A. Peard
Fred M. Dannenfelser

J. R. Sanford
J. G. Doughty
Inventors

UNITED STATES PATENT OFFICE.

JOSEPH R. SANFORD AND JOHN G. DOUGHTY, OF WINSTED, CONNECTICUT, ASSIGNORS TO THE FLEXIBLE RUBBER GOODS COMPANY, OF WINSTED, CONNECTICUT, A CORPORATION OF CONNECTICUT.

TIRE-TREAD.

No. 929,632.  Specification of Letters Patent.  Patented July 27, 1909.

Application filed January 6, 1909. Serial No. 470,930.

*To all whom it may concern:*

Be it known that we, JOSEPH R. SANFORD and JOHN G. DOUGHTY, citizens of the United States, residing at Winsted, county of Litchfield, State of Connecticut, have invented certain new and useful Improvements in Tire-Treads, of which the following is a full, clear, and exact description.

Our invention relates to improvements in tire treads, the same being of particular value and utility in connection with cushion or pneumatic tires, so-called.

The purpose of the improved tread is to give superior traction, greater durability, easier riding and resistance to skidding, so-called.

Figure 1:
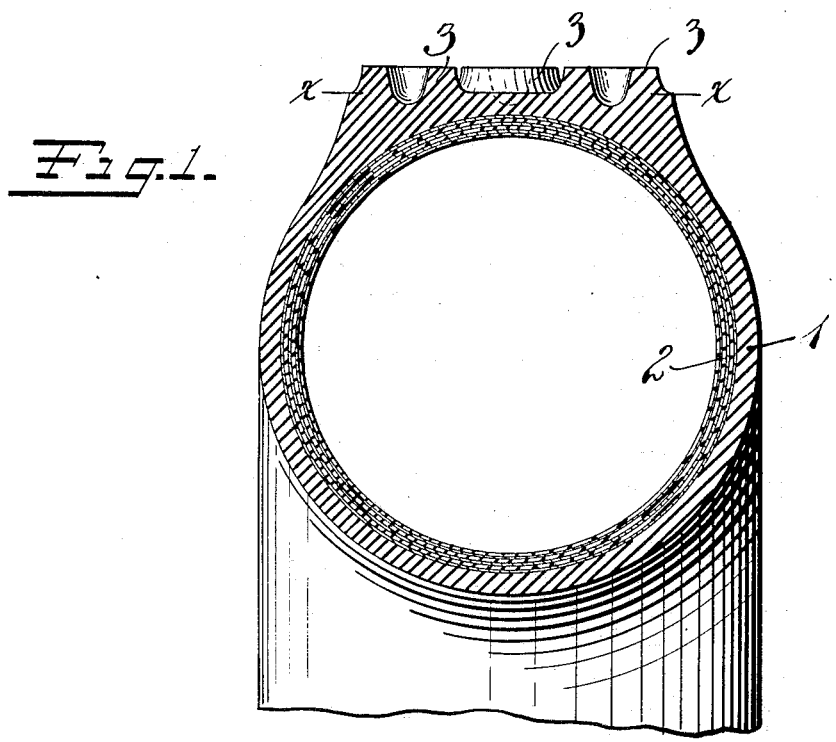
Figure 2:
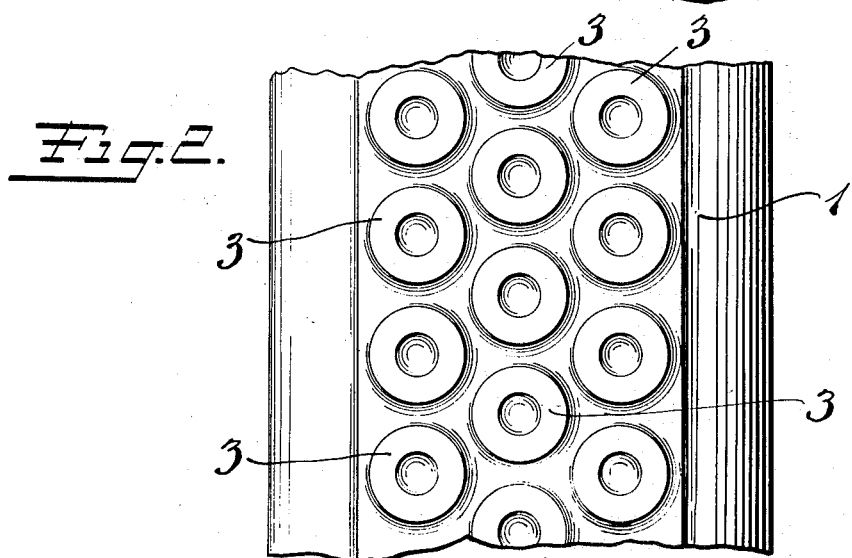

In the accompanying drawings Figure 1 is a sectional view of our improved tire. Fig. 2 is a development view of the tread laid out flat, the ends broken away.

1 represents the main body of the tire, in this instance of the pneumatic type, and provided with the usual fabric reinforcements 2. The tread of the tire is provided with a plurality of cupped projections 3—3—3 spaced apart and arranged in series extending around the tire and projecting beyond the solid portion thereof. There are by preference a plurality of series, two or more, three being shown in the drawings. The contact end of each cup 3 is preferably flat or substantially flat, as shown in Fig. 1, whereby a maximum surface engagement is obtained without undue flattening of the tire itself. By the employment of a flat tread, a much larger number of suction cups are available for encountering the road surface at the point of contact with the wheel than would be if the tread were round.

It is to be observed in the sectional view that the recess in each cup extends down very slightly below the plane of the bottom of the side walls of the cup, measured from the external base of the cup wall. The result is, when the projecting walls of the cup have worn away, there will still be a cavity retained in the tread of the tire where each cup was located which will still operate (though not as efficiently as when the wall is present) to aid traction and prevent skidding.

The action of the tread to secure superior traction is as follows: As the tread rolls over the ground, the road material fills the spaces around the walls of each cup and furnishes thereby a better grip for the tire, whereby the vehicle may be driven ahead. Upon pavements, hard and smooth surfaces, superior traction is obtained by this tire in the following manner: As the tire rolls ahead one side of each cup is first slightly compressed, thereby displacing a portion of the air therein. When finally each cup presents its face squarely to the road, expansion occurs and suction takes place at each cup, tending to hold the tire to the road surface. The action of the tire in preventing skidding is markedly increased on hard surfaces, wet or slippery, the moist surface serving to effectively seal the interior of the cup to the admission of air. A superior wearing surface is presented, because the walls of the cup furnish in reality additional rubber, and, to the extent that they project above the solid part of the tread, they increase the life of the tire correspondingly.

It is preferable when two or more series of suction cups are provided, to arrange said series so that the individual cups in one series will be staggered relatively to the individual cups in the adjacent series. This is best seen in Fig. 2. After long usage, when the side walls of the cups wear away, it will be observed that there will still be left in the solid face of the tire a recess where each cup was formerly provided. The solid face of the tire would appear approximately on the line x—x Fig. 1, and in said view it will be seen that the recesses project into the rubber to a point slightly below said line.

We have found that by extending the recess of the cup slightly below the main body of the tread it is more difficult to tear the cup away from the tread than if the bottom of the recess is located approximately on the plane with the surface of the main body of the tread. Consequently, by this feature of improvement, much greater strength and durability are added to the cupped extensions in addition to the advantages otherwise mentioned as growing out of this deepening of the cup cavity. This improvement also makes itself felt in that it renders the entire tread more durable.

What we claim is:

A tire tread having a multitude of air chambers formed within and thereon, the major portion of each air chamber being formed by walls of circular cross-section, each circular wall being flat-ended and of substantial thickness throughout and projecting beyond the body of the tread, the multitude of the flat ends of the projection forming the wearing surface of the tread, each hollow projection standing alone and acting independently from the others in creating vacuum and maintaining a suction contact with the road, the body of the tread and the projections being molded integrally.

JOSEPH R. SANFORD.
JOHN G. DOUGHTY.

Witnesses:
  WILBUR G. MANCHESTER,
  LOUISE B. PLUMB.